United States Patent [19]
Huckins et al.

[11] Patent Number: 5,284,212
[45] Date of Patent: Feb. 8, 1994

[54] TOMATO HARVESTER MOUNTABLE DOUBLE ROD CUTTER

[75] Inventors: Jeffrey A. Huckins; Willard Long, both of Woodland, Calif.

[73] Assignee: Woodland Tractor and Equipment Co., Inc., Woodland, Calif.

[21] Appl. No.: 932,608

[22] Filed: Aug. 19, 1992

[51] Int. Cl.⁵ .............................................. A01B 39/19
[52] U.S. Cl. ..................................... 172/44; 171/134
[58] Field of Search ........................... 56/327.1, 328.1; 171/10, 26–28, 46, 53, 55, 58, 142, 134; 172/44

[56] References Cited

U.S. PATENT DOCUMENTS

| | | | |
|---|---|---|---|
| 2,920,706 | 1/1960 | Turner | 172/44 |
| 2,954,085 | 9/1960 | Roberts | 172/44 |
| 3,033,135 | 5/1962 | Gouin | 172/44 X |
| 3,690,383 | 9/1972 | Malley et al. | 172/44 X |
| 4,159,745 | 7/1979 | Hood et al. | 172/44 |

Primary Examiner—David J. Bagnell
Attorney, Agent, or Firm—Mark C. Jacobs

[57] ABSTRACT

An apparatus adaptable to be mounted on the tomato harvesters of various manufacturers for the purpose of removing tomato plants from the ground with their tomatoes attached for delivery onto a tomato harvester, which mechanically separates the tomato fruit from the balance of the plant. This apparatus also reduces the amount of agglomerated earth or clods that sticks to the root system upon removal from the ground. The apparatus utilizes a pair of spaced cutter bars which rotate counterclockwise. Upon impact of the forward lower bar with the plant, the plant is pulled from the ground. As the plant travels rearwardly, the upper bar knocks dirt loose from the roots.

9 Claims, 5 Drawing Sheets 5,284,212

TOMATO HARVESTER MOUNTABLE DOUBLE ROD CUTTER

BACKGROUND OF THE INVENTION

The harvesting of tomatoes has in the last 20 years become almost totally mechanized. Today harvesters made by one of several companies can move quickly through a field to remove the whole tomato plant from the ground, separate the tomatoes from the plant, and even permit on-board sorting both manually and calorimetrically by electronic means. The first step of plant removal from the earth is generally carried out by a sickle type front attachment for the harvester. This device features the lateral movement of one notched blade relative to a infrapositioned stationary blade in the same fashion as a common home hedge trimmer.

While the sickle plant remover does an adequate job, it tends to permit excess dirt to stick to the roots of the plant. These dirt clods can and do interfere with the operation of the color sensitive LEDs or CCDs used to separate ripe from unripe tomatoes.

Thus, there seems to be a need for a more efficient means of plant removal. One that will separate the clods of dirt from the roots before the dirt can get into the sorter and cause jams in the sorter.

One object of this invention is to provide a new apparatus for removing tomato plants from the ground for the plants to be handled by a tomato harvester.

Another object is to provide an apparatus which will remove a significant portion of the residual dirt from tomato plant roots once the plants have been removed from the ground.

Yet another object is to provide an apparatus for removing tomato plants from the ground, which can be adapted for installation upon a plurality of tomato harvesters.

A still further object is to provide a tomato plant remover that is efficient, safe and easy to operate.

These and other objects of the invention will in part be obvious and will in part appear hereinafter.

The invention accordingly comprises the apparatus possessing the features, properties and the relation of components which are exemplified in the following detailed disclosure and the scope of the application of which will be indicated in the claims.

For a fuller understanding of the nature and objects of the invention reference should be made to the following detailed description taken in conjunction with the accompanying drawings.

SUMMARY OF THE INVENTION

An apparatus adapted to be mounted on various manufacturers' tomato harvesters to remove tomato plants from the ground with their tomatoes attached for delivery onto a tomato harvester, which harvester mechanically separates the tomato fruit from the balance of the plant. The apparatus also removes a good portion of the dirt clods that stick to the root system upon removal of the plant from the ground. The apparatus utilizes a pair of counterclockwise rotating spaced cutter bars which impact the tomato plant as the harvester travels through the field. On impact of the forward lower bar with the plant, the plant is pulled from the ground. As the plant travels rearwardly, the upper bar knocks dirt loose from the roots. Rotation of the bars is caused by the operation of a preferably hydraulic motor.

DESCRIPTION OF THE PREFERRED EMBODIMENT

Figure 1:
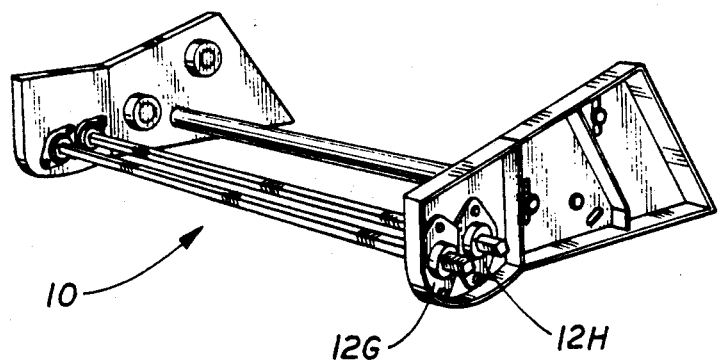
FIG. 1 is a right side perspective view of the apparatus of this invention as viewed from the front thereof.
Figure 5:
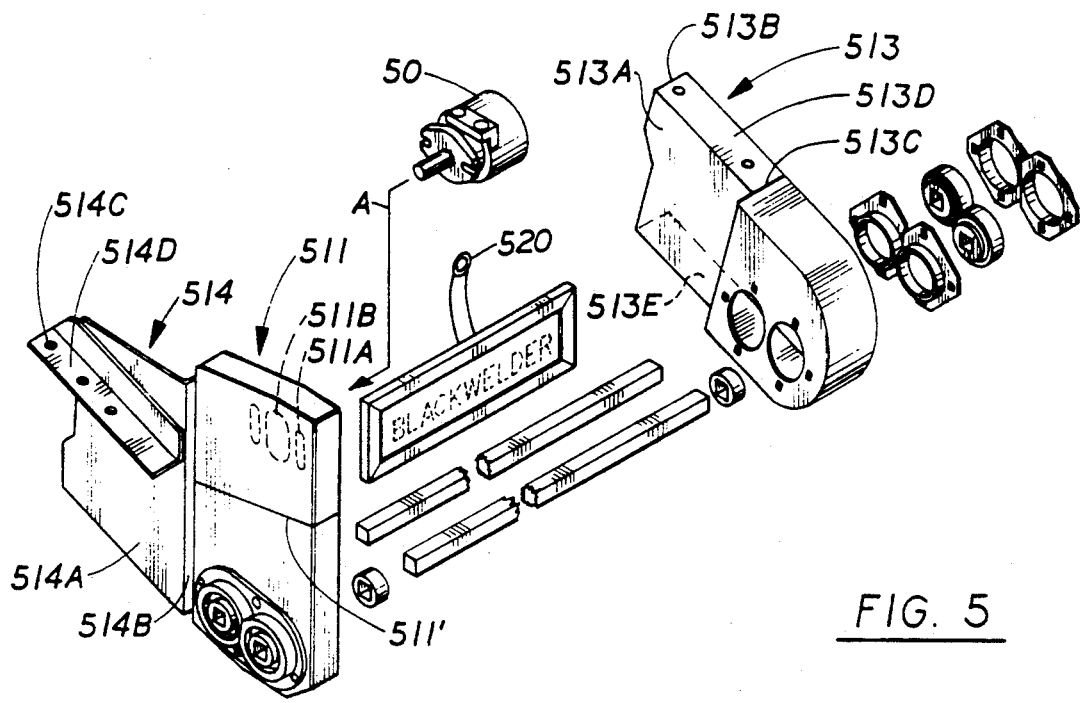
FIG. 5 is a perspective view of the mounting plates used to adapt the apparatus of this invention for mounting upon a Blackwelder tomato harvester.

FIG. 1 illustrates the apparatus of this invention as configured for mounting on an FMC Corporation tomato harvester but prior to the mounting thereof. For easier understanding of the parts and components that make-up this apparatus, the reader is referred to FIG. 2, an exploded view of the apparatus of FIG. 1. It is seen that apparatus 10 is comprised of ten key components; namely, the gear box assembly 11, which is spaced from and disposed opposite of the idler box assembly 12. Each of these assemblies is adapted to receive a pair of split collars 18. These collars 18 receive and retain the pair of spaced cutter rods 17. A conventional hydraulic motor, not seen in this figure, but designated 50 in FIG. 5 is mountable to motor mount 19, which mount attaches as shown to the gear box assembly. All of these previously named components 11, 12, 17, 18, and 19 taken together upon assembly comprise the main body 21. The remaining components other than identification tag 20 form the adapter kit 22 for mounting the main body upon a particular tomato harvester, which in this case is an FMC unit. The adapter kit 22 is seen therefore to include the left and right-hand mounting assemblies 13, 14 which are attached to the idler box and gear box assemblies respectively, and the left and right-hand gear box gusset plates 15, 16.

Figure 3:
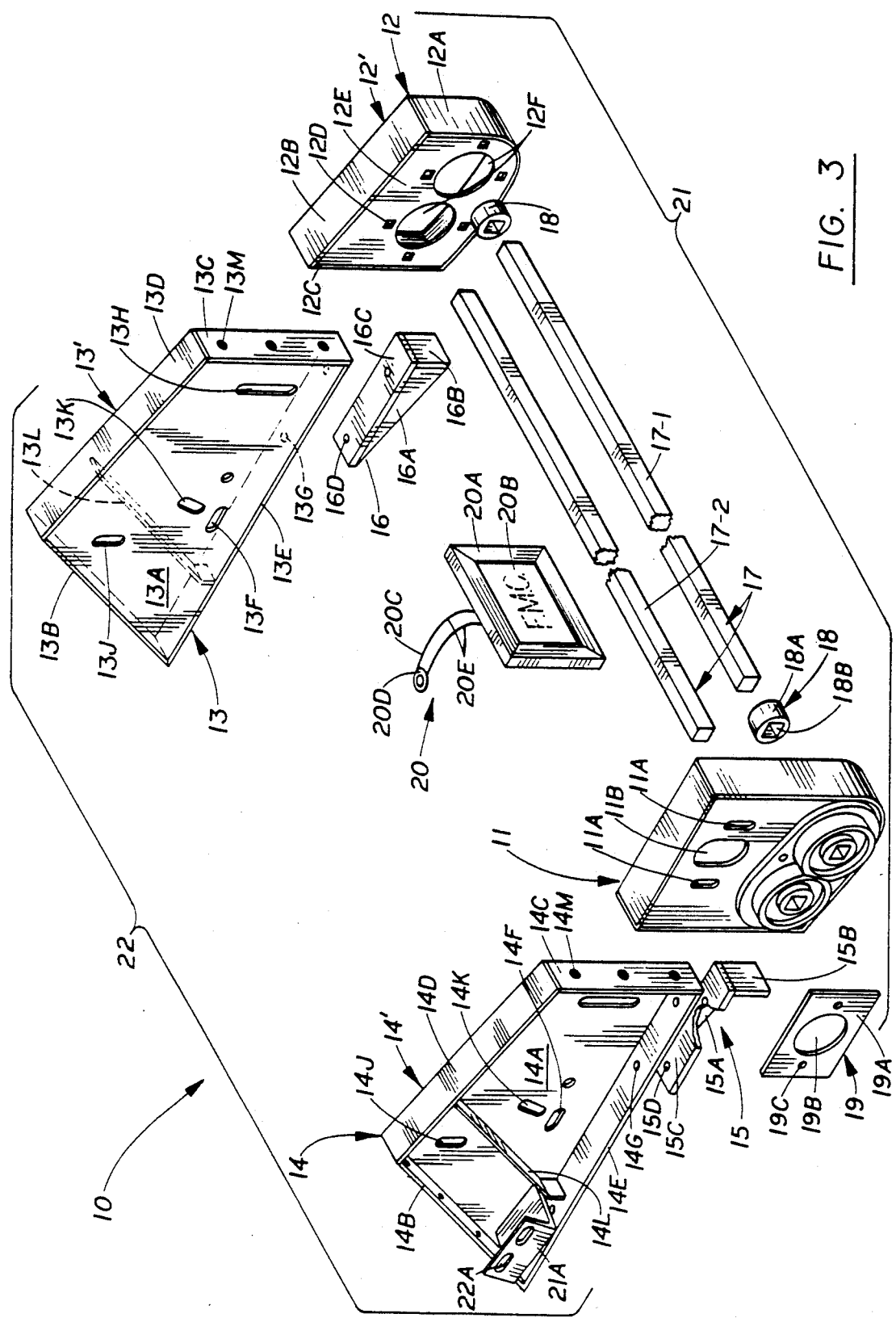
FIG. 3 is a more detailed version of the exploded view of the apparatus of FIG. 2.

Let us now turn to the details of the various components, as seen in FIG. 3. Since gear assembly 11 is seen to be set out in its own drawing, FIG. 4, most of the details of the gear assembly will be reserved for later. Note, however, the location of spaced elongated slots 11A with the oval opening 11B between them. These 3 are on the exterior wall in this embodiment, but will be seen to be on the interior wall in FIG. 4 and for the Blackwelder harvester apparatus.

The idler assembly 12 has a body 12' which is a generally rectangular box open on its exterior surface as per FIG. 1. It includes a combination front and bottom plate 12A, having a vertical first portion and a horizontal second portion connected by a curved intermediate third portion. Combination plate 12A is attached as by welding or bolting to top plate 12B at the edge of the first portion and to rear plate 12C at the edge of the second portion. Plates 12B and C intersect to form a corner. Connected to the framework formed by the aforementioned plates to complete the body 12' is the interior face plate 12E. Within the face plate are a pair of spaced openings 12F, adapted to receive the sleeve cap assemblies 12G, 12H seen in FIG. 1. The sleeve cap assemblies are bolted by bolts not seen in threaded apertures such as 12D shown in face plate 12E. Each sleeve cap assembly has an annular lip similar to the annular lip of the sleeve cap of the gear assembly to retain the collar lock 18 in frictional engagement.

Collar lock 18 is seen to have a cylindrical body 18A with a square central opening 18B, sized slightly larger than the two sides of the cutter rods 17.

Each of the two rods 17 are formed of 1' square solid stock of steel. They are disposed in the sleeve cap assemblies 14 of each of the idler and gear assemblies such that the rear rod 17-2 is about ½ inch higher than front rod 17-1.

Tag 20 includes a frame 20A with an indicia receiving section 20B attached to or disposed within frame 20A. Flexible portion 20C comprised of a pair of glue bearing tabs, 20D, is connected by two spaced wires or elastic strings 20E. One of the tabs 20D is adhesed to the rear surface of either frame 20A or indicia receiving section 20B. The tag may be applied as by looping the frame around the cutter bars and between the wires 20E -similar to the attachment of a luggage tag to a suitcase- or by attaching the other glue tab 20D to a cutter bar or other convenient part. The tag 20 serves to advise the customer, and for that matter unknowing retailers, for which tomato harvester the unit has been designed. In the illustration, it is the FMC.

The left-hand mounting assembly 13 and the right-hand mount assembly 14 are mirror image portions, but for the inclusion of an inverted L-shaped hose retainer bracket 21A having two slots 22A therein for clips or other hardware (not seen) to prevent the hydraulic hoses from dragging on the ground.

Each mount assembly 13, 14 includes a body 13', 14' which is an irregularly sided box with an open exterior surface. The body 13' is formed from a rear plate 13B welded or otherwise secured at a right angle to a forwardly declining top plate 13D, which in turn is secured to an upright front plate 13C, which in turn is secured to a normally disposed horizontal bottom plate 13E. Panel 13A disposed on the edge of each of these aforementioned plates, closes off the interior surface of the mounting assembly. Mounting assembly 14 is similarly constructed. Plates 13C and 14C each include a series of spaced optionally threaded bores 13M and 14M to receive bolts, not shown, which bolts emanate from the rear walls of the idler and gear assemblies respectively.

Each bottom plate 13E, 14E includes a forward pair of spaced apertures 13G, 14G to receive mounting screws or bolts (not shown) from gussets 15 and 16 respectively, as will be discussed infra. The mounting assemblies 13, 14 also include a plurality of elongated slots designated 13F or 14F, J, K located at strategic places in plates 13A & 14A.

Each gusset 15, 16 which includes a rectangular top plate 16C having the pair of aforementioned bores 16D, is welded or otherwise secured to a normally disposed front plate 16B. Two pairs of spaced slide plates 16A and 15A are welded or other wise attached to the right angle construction formed of plates 16C and B and 15C and B respectively. Panels 13A and 14A also include a series of strategically placed elongated slots such as 13F, H, J and K to engage components of the particular harvester being utilized. A diagonally disposed reinforcing member 14L and its equivalent 13L (not seen) may also be utilized.

Figure 4:
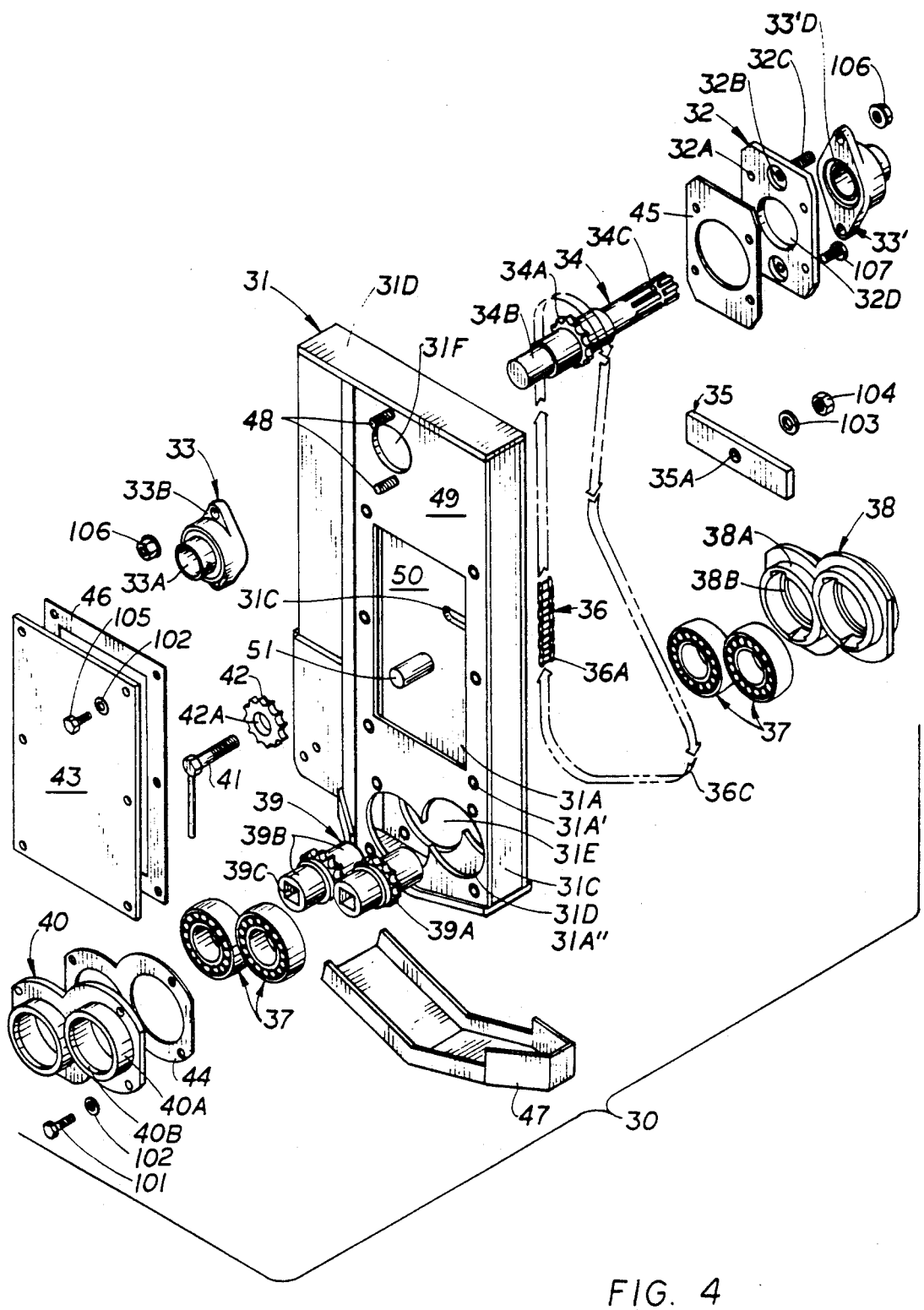
FIG. 4 is a rear exploded view of the gear assembly utilized in the apparatus of this invention.

The reader is now directed to FIG. 4, which is a rear exploded view of the gear box assembly 30, used in this invention. The same gear box assembly though perhaps cosmetically different is used for all of the versions of this apparatus. An assembly 30 of this general configuration is available from Picket Equipment Co. of Burley, Id., U.S.A.

The shank or body of the gear box 31 comprises a pair of similarly sized left and right plates 49 and 50 which are spaced from each other and joined to top plate 31D and front plate 31C. Plate 49 includes an opening 31F having two mounting studs 48 disposed outwardly therefrom. The upper chain case bearing 33 includes a pair of bored flanges 33B for mounting to studs 48 by nuts 106. When so mounted passage 33A is in alignment with opening 31F for the receipt of shaft 34.

Plate 49 also includes a central rectangular opening 31A, which opening is surrounded in a dice pattern of 6 threaded apertures 31A'. Cover 43 has similar unnumbered bores which align with threaded apertures 31A' for receipt of bolts 105, each with a lock washer 102 thereupon.

The right-hand plate or wall 50 includes a normally disposed spacer cylinder 51, the end of which prevents cover 43 from being desformed and impacting upon elements found in the space between the interior of wall 50 and said cover 43. The area of wall 50 falling within the rectangular opening 31A includes a preferably horizontal slot 31C, usually located in the upper rear corner area of that portion of the plate 50 visible through rectangular opening 31A. Idler sprocket bolt stop 41 passes through opening 42A in idler sprocket 42 and then through said slot 31C as well as the optionally rectangular idler sprocket guide 35's opening 35A, said guide being disposed on the exterior side of plate 50 for mounting by a lock washer and nut 103, 104.

Figure 8:
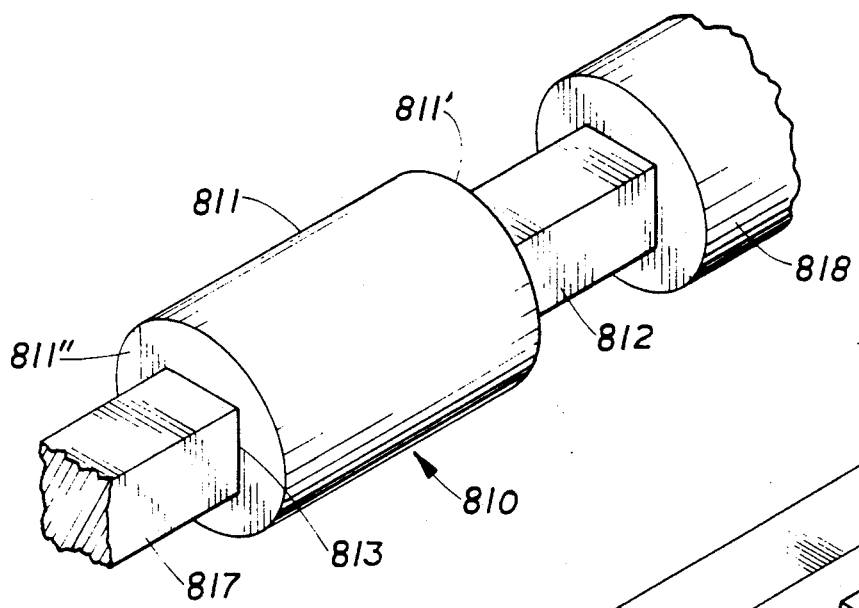
FIG. 8 is a diagrammatic view of the round collar for the square cutter tubes.

Plates 49 and 50 each include a lazy FIG. 8 opening 31D, 31E respectively for receipt of the two outer sprocket shaft assemblies 39. Each of these assemblies has a centrally disposed sprocket 39A, adapted to engage chain 36 as will be described infra.

Each assembly 39 further includes a pair of opposed cylindrical portions 39B, one on each side of the sprocket 39A. Each cylindrical portion includes a central square end recess 39C. Each portion 39B is sized in diameter to receive a bearing 37. The diameters of each section of the FIG. 8 openings 31D, 31E are sized to be slightly greater than the diameter of each bearing 37 when mounted on their respective cylindrical portions 39B.

Left and right sleeve caps 40, 38, each having a pair of annular lips 40A, 38A respectively, sized to be slightly greater in diameter than bearings 37, fit over the bearings flat against the plates 49, 50 respectively. The bearings are retained therein by inwardly directed thickened sections 40B and 38B respectively. Each sleeve cap has suitable bores for the receipt of mounting bolts 101 carrying lock washers 102 for mounting in threaded apertures 31A" seen here only for plate 49.

Toothed shaft 34 previously referred to includes a first solid shaft section 34B, a central shouldered sprocket section 34A, and a third section which is a preferably slotted or splined cylindrical shaft section 34C.

An input shaft bearing mount 32, which is a plate having a central opening 32D, mounting bores 32A and a pair of outwardly extending threaded shafts 32C each of which last has a head 32B. Mount 32 is secured to main plate 50 by bolts 107 into suitable threaded bores in plate 50, not visible in this figure. Note only one bolt 103 is seen at this location to avoid clutter.

Another upper bearing case designated 33', similar to the one previously described, 33, mounts to the two threaded shafts 32C, only one of which is seen in the figure. Cap nuts 106, one of which is depicted, retain the case to the shafts 32C. This permits slotted shaft 34C to fit through opening 32D into the passage 33'D of the bearing.

The chain 36 having a plurality of links 36A engages the sprocket teeth 34A of toothed shaft 34 and the teeth 39A of the output sprocket shafts 39. The chain moves in a clockwise manner as shown by the arrow-like portion of the chain 36C, when power is applied to rotate shaft 34.

The wear plate cover 47 is a friction fit or a screw engageable element that closes off the bottom of the gear box assembly 31 in conventional fashion.

Also depicted are gaskets 44, 45, and 46 all of which preferably are employed across the FIG. 8 openings 31D & 31E, openings 31F & 32D and the rectangular opening 31A respectively in conventional fashion.

In FIG. 5, which is an exploded view of the unit designated for mounting upon a Blackwelder brand tomato harvester, the only differences lie in the mount means for adding the apparatus of this invention to the harvester. Since structurally and mechanically the unit is basically the same as the one described with respect to FIG. 2 only those differences will be numbered and discussed. Thus the hydraulic motor 50 while referred to previously as mounting to the exterior of the gear box for the FMC harvester, mounts on the internal side on the Blackwelder as indicated by arrow A. Gear box assembly 511 is similar to gear assembly 11 but for the enlarged housing as shown by the reference line 511', wherein the area above the line depicts the enlargement of the plates and panels previously described. Thus it is seen that the gear assembly 30 of FIG. 4 is in fact the unit depicted here for the Blackwelder harvester.

The elongated slots 511A and the oval opening 511B are shown in dotted line due to their presence on the interior fact of the assembly away from the viewer.

Here the right-hand mounting assembly 514 includes a first vertical plate 514A, having an inwardly directed front flange 514B. An elongated L-shaped member 514D having a series of bores 514C is welded or otherwise secured thereto depending rearwardly from front flange 514B. Tag 520 is similar to tag 20 but bears different indicia. The left-hand mounting assembly 513 is also an open box having a rear wall 513B, a front wall 513C, a top wall 513D and a bottom wall 513E. Cover plate 513A closes off the interior surface of this assembly with the exterior side being open, but not visible in this figure. Conventional construction techniques of the industry including bolting and welding are employed to attach the mount assemblies 513, 514 to the basic apparatus both here and in the embodiment of FIG. 6 below.

Figure 6:
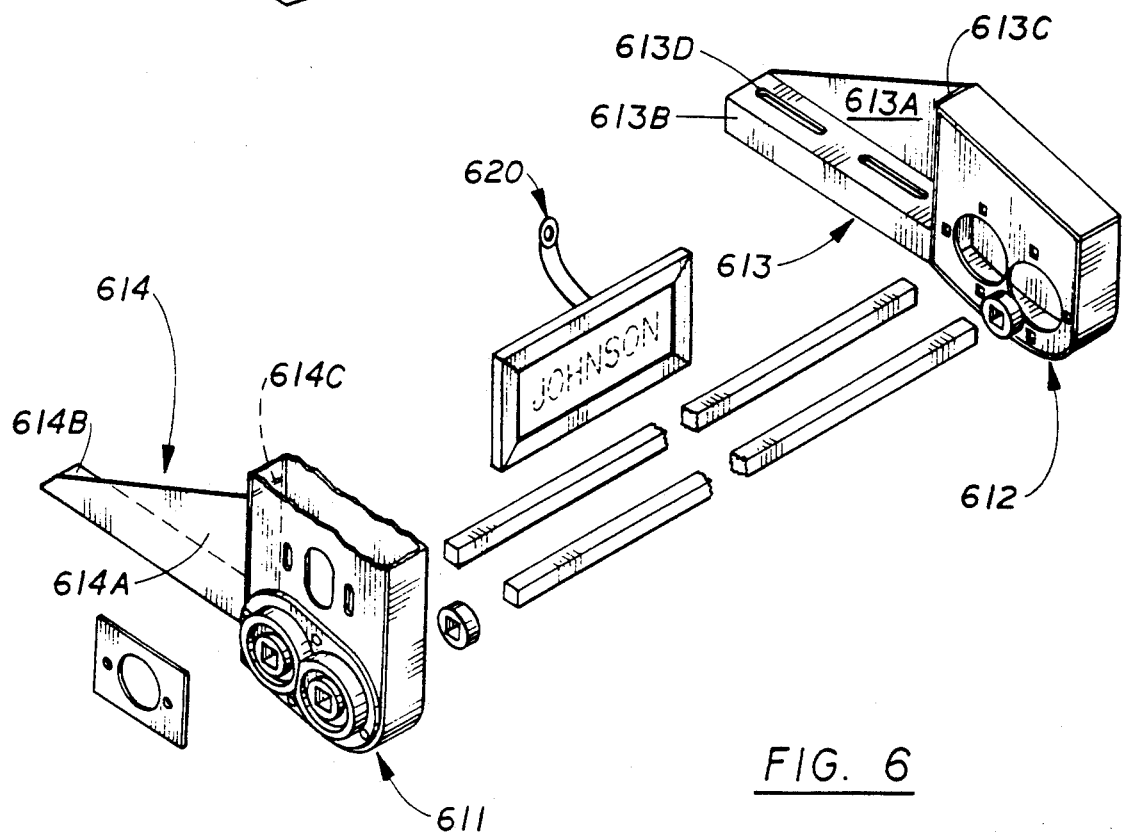
FIG. 6 is a perspective view of the mounting plates used to adapt the apparatus of this invention for mounting upon a Johnson tomato harvester.

Reference is now made to FIG. 6 wherein the 600 series of numbers have been employed. Here too only those differences in the mounting kit are discussed. Right mounting assembly 614 includes a vertical generally triangular plate 614A normally disposed to a smaller bottom plate 614B of a width equal to that of the gear assembly 611. A forward upstanding wall 614C is attached normally disposed to both plate 614B and panel 614A.

On the other side, the left mounting assembly includes a vertical triangular exterior panel 613A normal to a vertical forward plate 613C generally rectangular and of a width equal to that of the idler assembly 612. A box member 613B having a series of elongated slots 613D is attached at the lower end of the panel 613A and plate 613C. Tag 620 is indicative of a Johnson designated apparatus.

Figure 7:
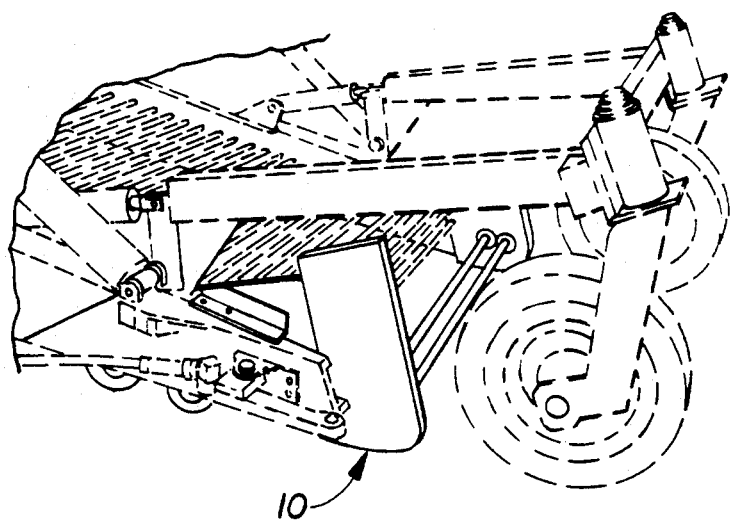
FIG. 7 is a perspective view showing the device of this invention mounted for use on a typical tomato harvester.

In FIG. 7 there is seen a diagrammatic view of a mounted unit of this invention. Since the apparatus has been discussed previously, no further discussion is deemed needed.

FIG. 8 depicts an alternate means of mounting the cutter rods forming a portion of this invention. Rather than using rods 17 to fit into collars 18 with the square recesses as discussed previously, an insert assembly 810 is employed for insertion into the collar here designated 818 but in construction the same as collar 18. Insert assembly 810 comprises a several inch long cylindrical member 811 having a square shaft 812 fixed to one surface, 811' of cylinder 811. The cylinder also has a square recess 813 set into its other face 811" for receipt of shorter rods 817. These shorter rods are more easily replaceable in case of damage, and there is less danger of destruction to collar 818 when this construction is employed.

Figure 2:
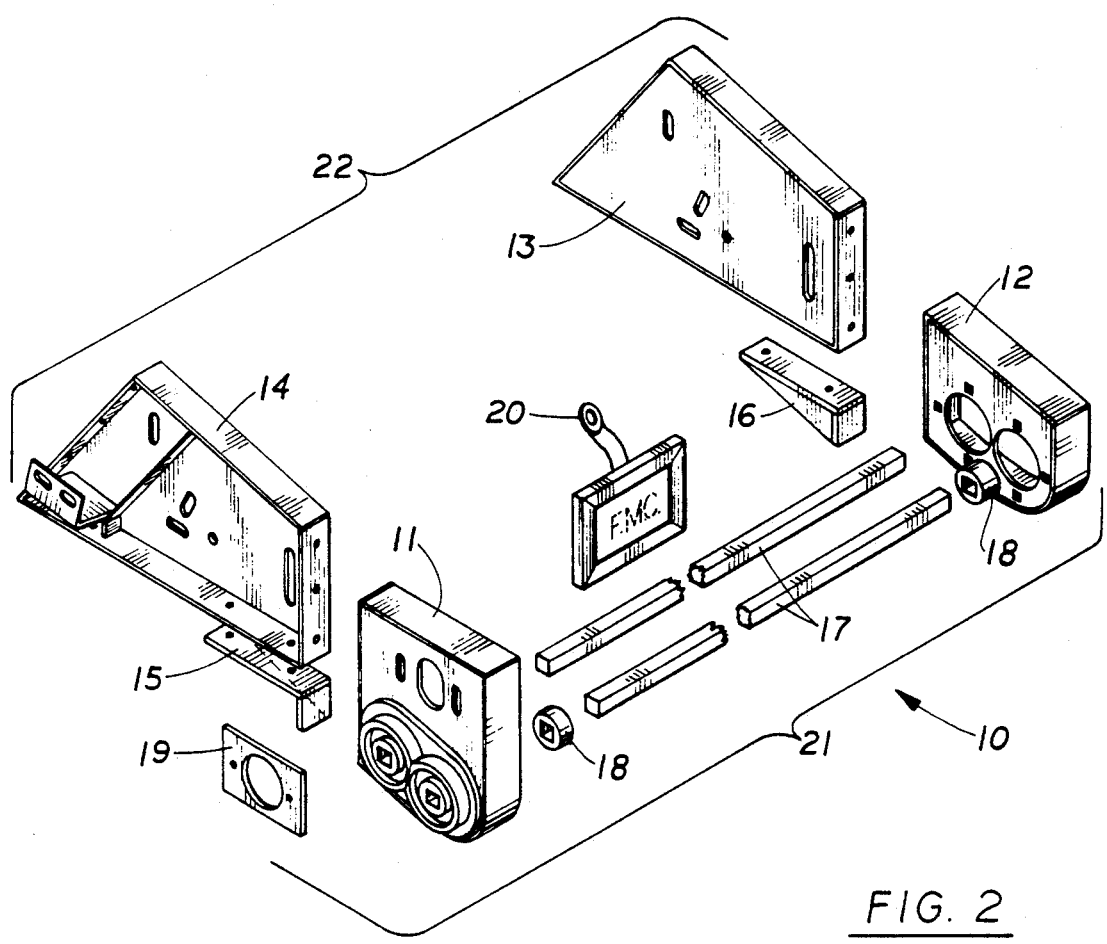
FIG. 2 is a left side exploded view of the apparatus of this invention.
Figure 9:
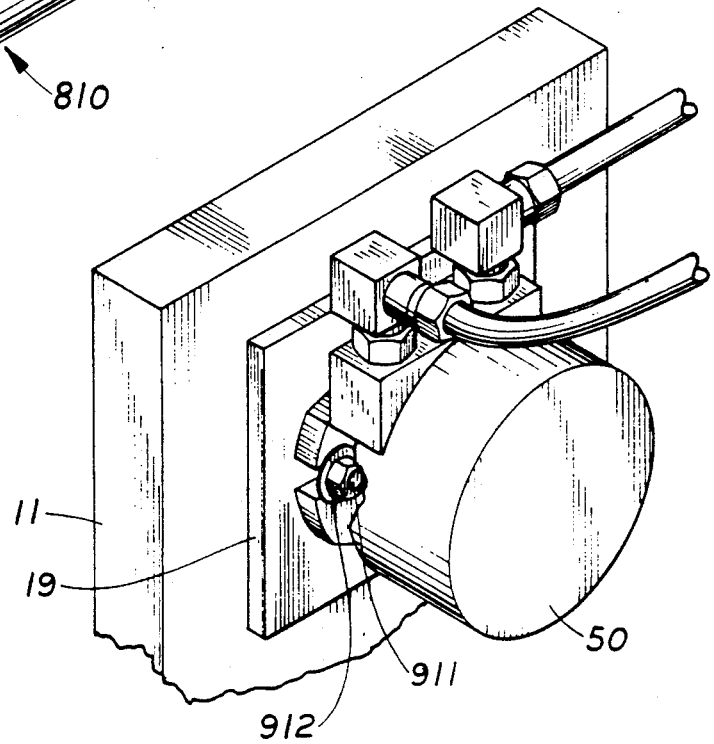
FIG. 9 is a close-up perspective view of a portion of the gear assembly showing the hydraulic motor in its operative location.

FIG. 9 is a close-up view of the embodiment of FIG. 2. Here hydraulic motor 50 is seen attached in a conventional manner to motor mount 19, and in turn to assembly 11 by bolts 911 inserted from the interior side of assembly 11. These are retained in place by hex nuts 912.

In the manufacture of the apparatus of this invention, best results have been obtained wherein the two cutter bars are preferably the same size; namely, one inch bar stock and preferably set in a position wherein the upper rod is spaced about 2-2½ inches back from the lower rod. Rod stock of up to three inches will produce satisfactory results, and the offset can be as low as non-existent up to about one inch. These rods, which are spaced from each other between less than one inch and up to several inches, and preferably about two inches apart can spin at any rate of from about 300 to about 750 rpm, depending upon the hydraulic motor employed. Good results are obtained when the speed is about 540 rpm. These rods are spinning in the earth at a depth of anywhere from about 1" to about 3" down.

It is seen that by using the apparatus of the instant invention, that tomato plants can be removed from the ground with less attached residue dirt to clog up the sorter portion of the harvester. The apparatus is simpler and easier to make than the sickle-type plant remover and is safer in that in a static position no sharp blades are exposed.

The device of this invention allows a field to be opened up for harvesting cheaper and faster than in the conventional manner employed in the U.S.A. today. Not only is certain farm equipment removed from the temporary idle condition while the field is first opened up, but the harvester can move along at 4 mph versus 2 mph with a sickle cutter thereon. Obviously this saves the farmer money being able to harvest faster.

While the apparatus has been shown to be hydraulically operated, an electric motor would also be suitable.

In conclusion it is seen that the double rod cutter of this invention is a safer more efficient and easier to use tool for the delivery of tomato plants to a field harvester. While adaptations have been discussed for attachment of the instant apparatus to tomato harvesters made by FMC, Johnson and Blackwelder, it is within the skill of the art to adapt the machine to be mountable on the tomato harvester of any other manufacturer.

Since certain changes may be made in the above apparatus without departing from the scope of the invention herein involved, it is intended that all matter contained in the above description and shown in the accompanying drawings shall be interpreted as illustrative and not in a limiting sense.

We claim:

1. An apparatus adapted to be mounted on tomato harvesters of various manufacturers for the purpose of removing tomato plants from the ground with their tomatoes attached for delivery onto a tomato harvester, which apparatus comprises:
   a. a gear box assembly and
   b. an idler box assembly, in a spaced relationship,
   c. each of which box assemblies includes means for retaining a pair of spaced lock collars in paired aligned opposed positions;
   d. lock collars disposed in each of said means for retaining lock collars;
   e. a pair of spaced cutter bars disposed in each pair of aligned opposed lock collars;
   f. said gear box assembly further including means in operative engagement with said gear box assembly to drive said gear box and turn said cutter bars and
   a mounting kit to mount said apparatus to a tomato harvester.

2. In the apparatus of claim 1 wherein the means for mounting is specifically adapted to fit a tomato harvester selected from the group consisting of harvesters made by FMC, Johnson, and Blackwelder.

3. In the apparatus of claim 1 wherein the means to drive said gear box is a hydraulic motor mounted upon said gear assembly and in operative engagement therewith.

4. In the apparatus of claim 1 wherein the cutter bars are each 1' rod stock, disposed one above the other.

5. In the apparatus of claim 4 wherein the cutter bars are offset from each other, such that the upper one is about 2-2½ inches behind the lower one.

6. In the apparatus of claim 1 wherein the gear box assembly is chain driven.

7. In the apparatus of claim 1 wherein the means to retain the lock collars in aligned position are bearing sleeve cap assemblies.

8. An apparatus adaptable to be mounted on tomato harvesters of various manufacturers for the purpose of removing tomato plants from the ground with their tomatoes attached for delivery onto a tomato harvester, which apparatus comprises:
   a. a gear box assembly and
   b. an idler box assembly, in a spaced relationship,
   c. each of which box assemblies includes means for retaining a pair of spaced lock collars in paired aligned opposed positions;
   d. lock collars disposed in each of said means for retaining lock collars;
   e. a pair of spaced cutter bars disposed in each pair of aligned opposed lock collars;
   f. said gear box assembly further including a hydraulic motor in operative engagement with said gear box assembly to drive said gear box and turn said cutter bars and
   g. means for mounting the gear assembly and the idler assembly to a tomato harvester.

9. In the apparatus of claim 8 wherein the means to retain the lock collars in aligned position are bearing sleeve cap assemblies.

* * * * *